United States Patent
Zhao et al.

(10) Patent No.: US 9,239,732 B2
(45) Date of Patent: Jan. 19, 2016

(54) UNROLLING AGGREGATION OPERATIONS IN ASYNCHRONOUS PROGRAMMING CODE HAVING MULTIPLE LEVELS IN HIERARCHY

(75) Inventors: Xiaoxuan Zhao, Shanghai (CN); Sridhar Srinivasan, Shanghai (CN); Xiang Zhou, Redmond, WA (US); Fengbin Jiang, Beijing (CN)

(73) Assignee: Microsoft Technology Licensing LLC, Redmond, WA (US)

( * ) Notice: Subject to any disclaimer, the term of this patent is extended or adjusted under 35 U.S.C. 154(b) by 322 days.

(21) Appl. No.: 13/028,552

(22) Filed: Feb. 16, 2011

(65) Prior Publication Data

US 2012/0210332 A1    Aug. 16, 2012

(51) Int. Cl.
| G06F 9/46 | (2006.01) |
| G06F 9/48 | (2006.01) |
| G06F 9/45 | (2006.01) |
| G06F 9/455 | (2006.01) |

(52) U.S. Cl.
CPC ............ G06F 9/4843 (2013.01); G06F 8/4443 (2013.01); G06F 9/45504 (2013.01); G06F 9/45525 (2013.01)

(58) Field of Classification Search
CPC .............................. G06F 9/4438; G06F 9/4843
See application file for complete search history.

(56) References Cited

U.S. PATENT DOCUMENTS

| 5,913,064 | A * | 6/1999 | Chen ............................. 717/108 |
| 7,774,750 | B2 | 8/2010 | Chrysanthakopoulos |
| 2002/0029299 | A1 * | 3/2002 | Kappel et al. ................. 709/318 |
| 2005/0066149 | A1 * | 3/2005 | Kanade ............................. 712/1 |
| 2005/0188364 | A1 | 8/2005 | Cockx et al. |
| 2006/0265403 | A1 * | 11/2006 | Mercer et al. .................... 707/10 |
| 2007/0011666 | A1 * | 1/2007 | Tan ................................ 717/140 |
| 2007/0033551 | A1 * | 2/2007 | Greaves et al. .................... 716/3 |
| 2007/0094336 | A1 * | 4/2007 | Pearson .................. H04L 51/22 709/206 |
| 2007/0106997 | A1 | 5/2007 | Lin et al. |
| 2008/0148259 | A1 | 6/2008 | Hankins et al. |
| 2008/0168130 | A1 * | 7/2008 | Chen et al. ..................... 709/203 |
| 2008/0168438 | A1 * | 7/2008 | Meijer et al. ........ G06F 9/45504 718/1 |

(Continued)

OTHER PUBLICATIONS

"The Asynchronous Programming Models (C# 5.0 Series)"—Published Date: Nov. 16, 2010 codeproject.com/Articles/126609/The-Asynchronous-Programming-Models-Csharp-5-0-Ser.aspx.

(Continued)

*Primary Examiner* — Meng An
*Assistant Examiner* — James J Lee
(74) *Attorney, Agent, or Firm* — Bryan Webster; Kate Drakos; Micky Minhas

(57) ABSTRACT

One or more techniques and/or systems are disclosed for improving asynchronous programming execution at runtime. Asynchronous programming code can comprise more than one level of hierarchy, such as in an execution plan. Respective aggregation operations in a portion of the asynchronous programming code are unrolled, to create a single level iterative execution, by combining elements of the multi-level iterative execution of the asynchronous programming code. In this way, the aggregation operations are concatenated to local logic code for the aggregation operations. Thread context switching in the unrolled portion of asynchronous programming code is performed merely at an asynchronous operation, thereby mitigating unnecessary switches. Exceptions thrown during programming code can be propagated up to a top of a virtual callstack for the execution.

20 Claims, 10 Drawing Sheets

(56) References Cited

U.S. PATENT DOCUMENTS

| | | | | |
|---|---|---|---|---|
| 2009/0083723 | A1* | 3/2009 | Zawawy | 717/155 |
| 2009/0089764 | A1* | 4/2009 | Lai et al. | 717/143 |
| 2009/0172713 | A1* | 7/2009 | Kim et al. | 719/331 |
| 2009/0254892 | A1* | 10/2009 | Yamashita | 717/146 |
| 2009/0293073 | A1 | 11/2009 | Nathan et al. | |
| 2010/0235817 | A1 | 9/2010 | Kahlon et al. | |
| 2010/0313184 | A1 | 12/2010 | Gustafsson et al. | |
| 2010/0325608 | A1* | 12/2010 | Radigan | 717/106 |
| 2011/0023033 | A1* | 1/2011 | Memik et al. | 718/100 |
| 2011/0029975 | A1* | 2/2011 | Zhang et al. | 718/100 |
| 2011/0173503 | A1* | 7/2011 | Salapura et al. | 714/45 |
| 2011/0202924 | A1 | 8/2011 | Banguero et al. | |
| 2013/0167126 | A1* | 6/2013 | Iyer et al. | 717/140 |

OTHER PUBLICATIONS

Richter, Dave, "The C# Asynchronous Programming Model"—Published Date: Jul. 27, 2009 c-sharpcorner.com/UploadFile/logisimo/107252009003250AM/1.aspx.

Ostrovsky, Igor, "Simplify Asynchronous Programming with Tasks"—Published Date: Sep. 2010—msdn.microsoft.com/en-us/magazine/ff959203.aspx.

Blazquez, Javier, "Asynchronous Programming with Coroutines in C++"—Published Date: May 2009 cs.aau.dk/~bt/GameProgrammingE09/AsynchronousProgramming.pdf.

"Design and Implementation Guidelines for Web Clients"—Published Date: Nov. 2003 msdn.microsoft.com/en-us/library/ff647332.aspx#diforwc-ch06_usingasynchronousoperations.

"A Coroutine Model for C++"—Published Date: May 5, 2005 libstream.sourceforge.net/coroutine.html.

Pyarali; et al., "Proactor"—Published Date: Sep. 1997 scribd.com/doc/28283282/Proactor-An-Object-Behavioral-Pattern-for-Demultiplexing-and-Dispatching-Handlers-for-Asynchronous-Events.

"Reducing Context Switching"—Published Date: 2010 msdn.microsoft.com/en-us/library/aa745205%28BTS.10%29.aspx.

Jaaskelainen; et al., "Reducing Context Switch Overhead with Compiler-Assisted Threading"—Published Date: Dec. 17-20, 2008, http://tce.cs.tut.fi/papers/Threading.pdf.

"Concurrent and Coordination Runtime (CCR Library)", Retrieved: Nov. 24, 2010, msdn.microsoft.com/en-us/library/bb905470.aspx.

Richter, Jeffrey, "Concurrent Affairs Simplified APM With the AsyncEnumerator", MSDN Magazine, Jun. 2008, msdn.microsoft.com/en-us/magazine/cc546608.aspx.

"International Search Report", Mailed Date: Oct. 31, 2012, Application No. PCT/US2012/024785, Filed Date: Feb. 12, 2012, pp. 9.

"Sequential Asynchronous Workflows in Silverlight using Co-routings", Jeremy Likness, Mar. 23, 2010, reprinted from the Internet at: http://csharperimage.jeremylikness.com/2010/02/sequential-asynchronous-workflows-in.html, 12 pgs.

"Asynchronous Programming Model/Task, Factory from Asyc", Shiv Kumar, Feb. 23, 2011, reprinted from the Internet at: http://www.matlus.com/httpwebrequest-asynchronous-programming/, 13 pgs.

"Synchronization (Avoiding Race Conditions) without Blocking Threads", Mar. 11, 2009, reprinted from the Internet at: http://software.inel.com/en-us/articles/synchronization-avoiding-race-conditions-without-threads/, 2 pgs.

EP Search Report cited in EP Application No. 12747863.4 dated Oct. 13, 2014, 11 pgs.

EP Communication cited in EP Application No. 1274863.4 dated Oct. 30, 2014, 1 pg.

"More AsyncEnumeratorFeatures", Jeffrey Richter, Aug. 2008, MSDN Magazine, Issues and Downloads, reprinted from the Internet at: msdn.microsoft.com/en-us/magazine/cc721613.aspx, 6 pgs.

"Simplified APM with C#", Jeffrey Richter, Nov. 2007, MSDN Magazine, Issued and Downlowads, reprinted from the Internet at: msdn.microsoft.com/en-us/magazine/cc163323.aspx, 6 pgs.

"Revisiting Coroutines", Ana Lucia De Moura and Robert Ierusal Imschy, Feb. 2009, ACM Transactions on Programming Languages and Systems, vol. 31, No. 2, Article 6, 32 pgs.

"Inline Expansion", Dec. 2010, Wikipedia, reprinted from the Internet at: en.wikipedia.org/wiki/inline_expansion, 6 pgs.

* cited by examiner

```
{
  ...
  Operation1.BlockOnYield = false;
  Yield return operation1;
  ...
  Operation2.BlockOnYield = false;
  Yield return operation2;
  ...
  Operation3.BlockOnYield = true;
  Yield return operation3;
  ...
  Operation4.BlockOnYield = true;
  Yield return operation4;
}
```

UNROLLING AGGREGATION OPERATIONS IN ASYNCHRONOUS PROGRAMMING CODE HAVING MULTIPLE LEVELS IN HIERARCHY

BACKGROUND

Programming code can be written in a synchronous manner, which may comprise executing the code in a sequential manner. For example, a first operation may be performed, and a result of the first operation can be used as input for a second operation. This type of programming is typically easy to write, but may not be efficient to execute (e.g., where output of a first operation is used as input for a second operation, the second operation may have to wait a considerable amount of time for the first operation to complete execution before the second operation can begin execution). For example, a code execution process thread may become blocked in synchronous programming execution when there is a long Input/Output call, where a result may take a long time to return. In this example, the continued execution of the programming may be stalled while the thread is blocked from continued execution. Asynchronous programming may provide a multi-thread execution of the programming, by performing some asynchronous operations on a separate thread. Therefore, if one thread becomes blocked, it may not cause the execution of the programming to be blocked. However, while more efficient, asynchronous programming is more difficult to write.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Traditional asynchronous programming models have attempted to solve a problem of thread blocking when executing long run tasks. Asynchronous programming can provide for releasing a process execution thread when performing some long Input/Output (I/O) call(s), but it can also complicate an application design and programming process by introducing asynchronous callback delegates and asynchronous state passing around the process execution. That is, there are still problems with different asynchronous programming solutions.

Accordingly, one or more techniques and/or systems are disclosed where an efficient and easy-to-use asynchronous programming framework may be implemented to help a programmer program asynchronous code in a sequential fashion, similar to traditional synchronous programming. Unnecessary thread context switches can be removed, for example, thereby mitigating computational cost of context thread switching, and a user-friendly interface and operation abstraction may be provided. Further, exceptions during runtime can be propagated up a virtual callstack, for example, in a manner that may be familiar to traditional (synchronous) programmers.

In one embodiment for improving asynchronous programming execution at runtime, where asynchronous programming code comprises more than one level of hierarchy, respective aggregation operations in a portion of asynchronous programming code can be unrolled. In this embodiment, the unrolling can comprise combining elements of a multi-level iterative execution of the asynchronous programming code to a single level iterative execution, thereby converting aggregation operations to concatenated local logic code for the aggregation operation. Further, thread context switching in the unrolled portion of asynchronous programming code can be performed merely at an asynchronous operation, thereby mitigating unnecessary switches.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
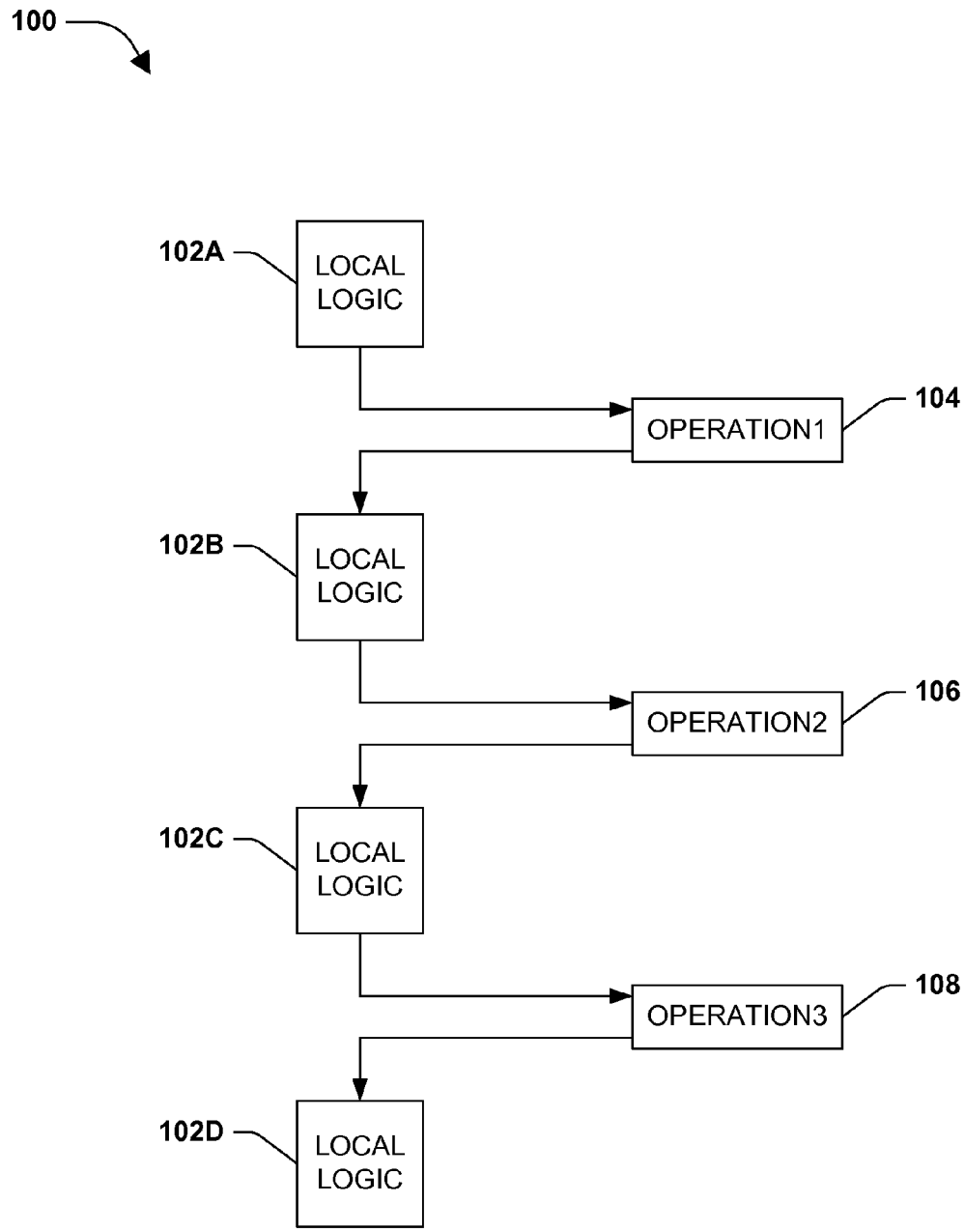
FIG. 1 illustrates an example embodiment of one or more current or existing techniques where asynchronous code may be executed.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

FIG. 1 illustrates an example embodiment 100 of one or more current or existing techniques where asynchronous code may be executed. In this example embodiment 100, a sequential asynchrony exists in the code, where asynchronous operations can be performed sequentially, using some iterative execution. The asynchronous programming code comprises a series of asynchronous operations 104, 106, 108, with associated local logic 102. In this example 100, local logic 102A is read for operation one 104, which can produce a result, comprising input for local logic 102B. In turn, operation 2 106 is performed, and then operation three 108 is performed.

In this example 100, the operation 104, 106, 108 comprise asynchronous operations that are performed in a specified sequence according to the programming code, thereby resulting in a sequential asynchrony. The local logic 102 comprises programming in sequence, where a process thread may be attached and detached at a beginning and end of the respective logics 102. Further, the local logic can comprise some pointer to the asynchronous operation 104, 106, 108, which may be performed on another process thread, asynchronous to the local logic process thread. However these asynchronous operations are performed in a sequential manner with respect to the local logic 102, for example, where operation one 104 may produce a result that is used by operation two 106, which in turn may produce a result used by operation three 108.

An example of traditional programming code, such as for synchronous programming, as expressed in pseudo code, may comprise:

```
{
    // Define some local context
    ...
    result1 = operation1.execute(someLocalContext);
    result2 = operation2.execute(result1, someLocalContext);
    ... // Handles result2
}
```

An example of traditional programming code, such as for asynchronous programming using (e.g., using a common language runtime (CLR) asynchronous programming model (APM)), as expressed in pseudo code, may comprise:

```
Method1( )
{
    ...
    operation1.beginExecute(Callback1, someLocalContext);
    ...
}
Callback1(AsyncResult ar)
{
    ...
    result1 = operation1.EndExecute( );
    someLocalContext = ar.AsyncState;
    operation2.BeginExecute(result1, Callback2, someLocalContext);
    ...
}
Callback2(AsyncResult ar)
{
    result2 = operation2.EndExecute( );
    ...
}
``` where callbacks are made to asynchronous operations, such as executing on a separate process thread.

Figure 2:
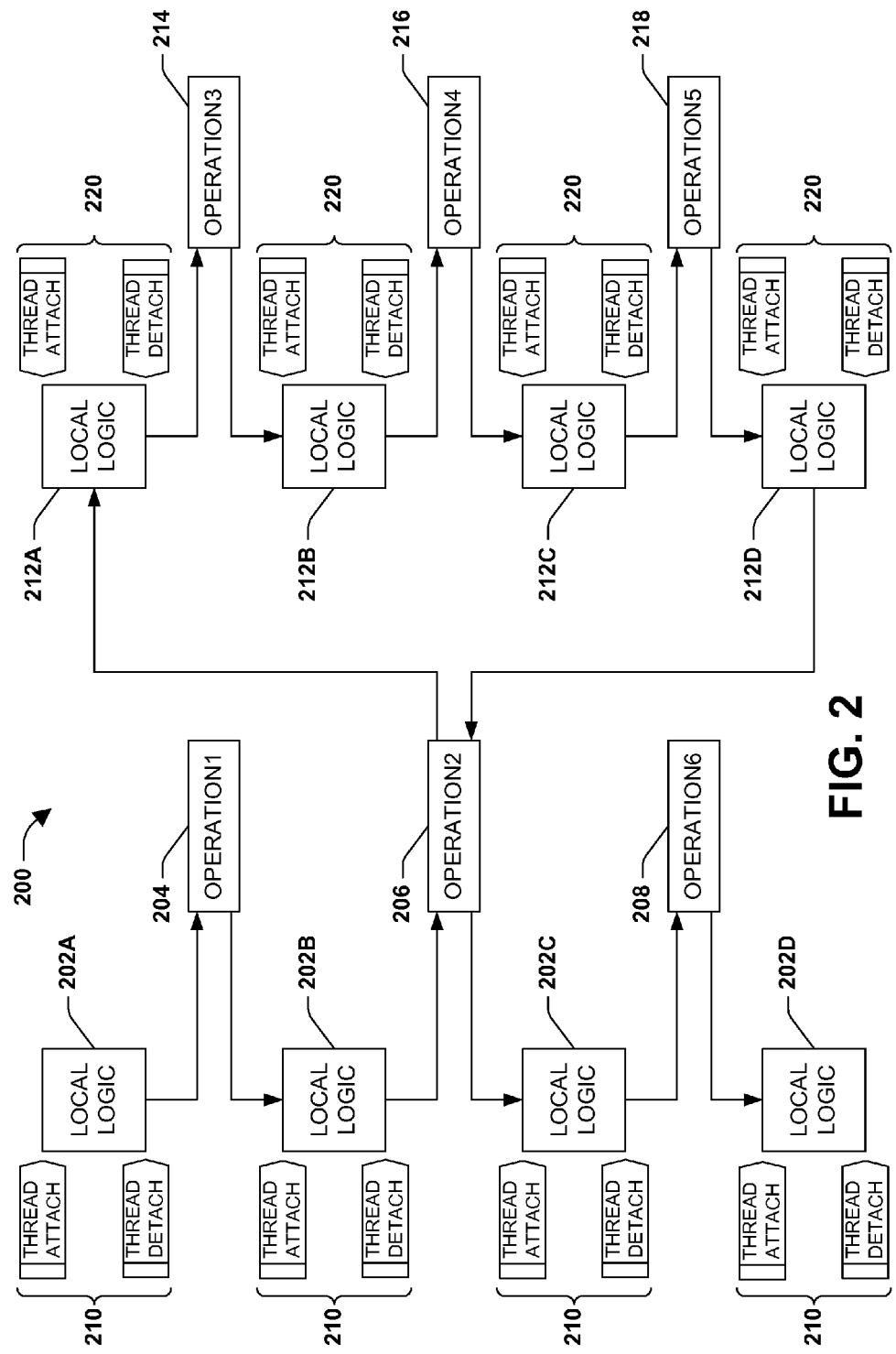
FIG. 2 illustrates an example embodiment of one or more current or existing techniques where asynchronous code may be executed.

FIG. 2 illustrates an example embodiment 200 of one or more current or existing techniques where asynchronous code may be executed. In this example embodiment 200, a more complex illustration of sequential asynchrony can exist in the code, where asynchronous operations can be performed sequentially using iterative execution, and an operation may aggregate other operations in a hierarchical structure. This example comprises local logic 202A and a first operation 204, then local logic 102B and second operation 206.

At a beginning and end of the respective local logic sections 202A and 202B of the code, during execution, a process thread is attached and detached 210. For example, when a yield on return operation exists, such as in local logic, a thread is detached. Further, when an operation finishes executing there is a thread attach. This thread attach/detach 210 comprises a computationally expensive process thread context switch. The context switching consumes central processing unit (CPU) resources, and can add to design costs for complex coding.

In this example 200, the second asynchronous operation 206 comprises an aggregation operation, for example, which can comprise an aggregation of multiple operations that run within the second operation (e.g., and not a true asynchronous operation, but merely a pointer to other operations). Operation two 206 comprises an aggregation of asynchronous operations three 214, four 216 and five 218, and local logic 212 for the asynchronous operation two 206. Therefore, in a sequential asynchrony, for example, operation three 214 is executed after operation two 206 (e.g., as part of the operation two), with operation four 216 and five 218 to follow in sequence. Further, in this example, thread context switching 220 occurs at a beginning and end of the respective local logic sections 212A-D of the code execution, thereby using more CPU resources for each operation.

After local logic 212D is executed, the processing returns to asynchronous operation two 206, with asynchronous operation six 208 following. In this example 200, while the coding comprises the asynchronous operations one through six, they are respectively executed in sequence. Further, at the respective operations a thread context switch occurs 210, 220, where the process thread executing the local logic detaches and attaches for the asynchronous operation (e.g., which may run on a different process thread). In the example 200, eight separate context switches are used to execute the code, where the code comprises five asynchronous operations 204, 208, 214, 216, 218, and an aggregation operation 206.

A method may be devised that provides for an efficient and easy to use asynchronous programming framework, which can help a programmer to program asynchronous code in a sequential manner that is similar to synchronous programming (e.g., sequential asynchrony). Unnecessary thread context switches can be removed during code executions, which may provide a more efficient runtime. Further, exceptions can be propagated in a way that programmers may be familiar with in more traditional programming. Additionally, operation call batching can be provided, along with parallel operation execution, which can further improve efficiency.

Figure 3:
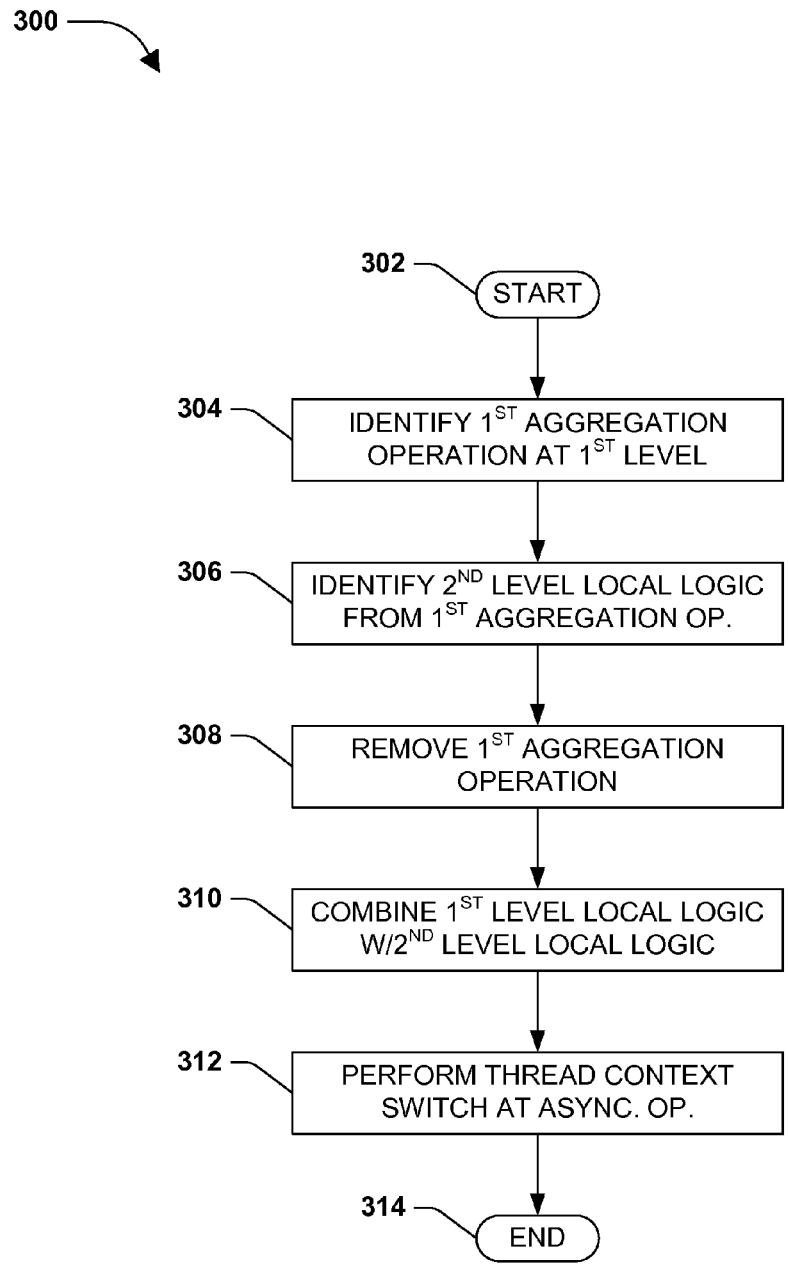
FIG. 3 is a flow diagram of an exemplary method for improving asynchronous programming execution at runtime.

FIG. 3 is a flow diagram of an exemplary method 300 for improving asynchronous programming execution at runtime. For illustrative (but not limiting) purposes, reference will be made to FIGS. 4A and 4B, which illustrate embodiments 400 and 450 where one or more techniques described herein may be implemented. The exemplary method 300 begins at 300 and involves identifying a first aggregation operation at a first level, at 304. For example, with reference to FIGS. 4A and 4B, the first aggregation operation in example embodiment 400 of FIG. 4A comprises 404B. A first asynchronous operation 404A may be performed first, for example, in a sequential asynchrony arrangement, but the first aggregation in a first level comprises the aggregation operation 404B. In this example 400, aggregation operation one 404B aggregates local logic code 406 and three operations 408.

Returning to FIG. 3, at 306, a second level local logic is identified from the first aggregation operation. For example, in FIG. 4A, the first aggregation operation 404B can indicate a second level in a hierarchy of the execution of the code, where the first aggregation operation 404B comprises code elements for the second level, such as the local logic 406 and/or operations 408. Further, in this example, a second aggregation operation 408A and a third aggregation operation 408C can be identified at the second level, and a third level may be indicated by these operations.

Figure 4A:
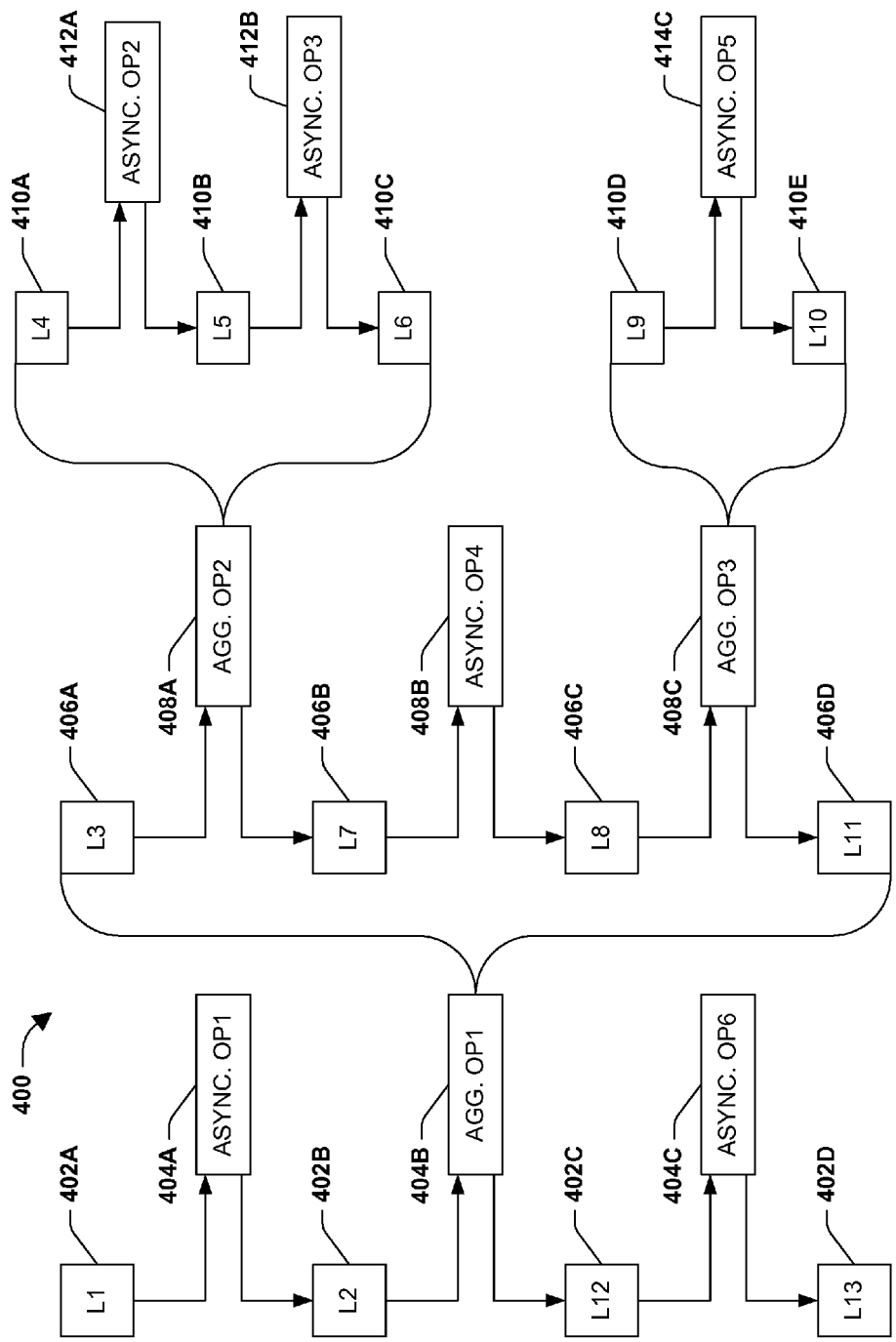
FIGS. 4A and 4B illustrate example embodiments where one or more techniques described herein may be implemented.

A multi-level hierarchy can be indicated by identified aggregation operations in respective levels, for example, where respective aggregations can indicate a next level in the hierarchy, as illustrated in FIG. 4A. Additionally, respective levels can comprise local logic and operations indicated by the aggregation operations. For example, aggregation operation two 408A comprises local logic 410A-C and asynchronous operations 412A & B, and aggregation operation three 408C comprises local logic 410D & E and an asynchronous operation 414C.

In the example embodiment 400, local logic three 406A can be identified from the first aggregation operation 404B. Further, local logic four 410A can be identified from the second aggregation operation 408A. As an illustrative example, for sequential asynchrony execution in the example embodiment 400, local logic two 402B is followed by local logic three 406A, which is followed by local logic four 410A. In this example, the programming of the respective local logics can be executed without an intervening asynchronous operation. As illustrated in FIG. 4A, merely aggregation operations one 404B and two 408A intervene between the local logics two 402B, three 406A and four 410A.

Returning to FIG. 3, at 308, the first aggregation operation identified is removed. For example, as described above in FIG. 4A, the first aggregation operation 404B intervenes local logic two 402B and local logic three 406A, which was identified in the second level from the first aggregation operation 404B. Further, as an example, aggregation operation two 408A intervenes local logic three 406A and local logic four 410A. In one embodiment, aggregation operation one 404B and/or aggregation operation two 408A can be removed. Additionally, at 310 in FIG. 3, the first level local logic 402A can be combined with the second level local logic 406A (e.g., and with the third level local logic 410A, and so-on if additional levels are present).

Figure 4B:
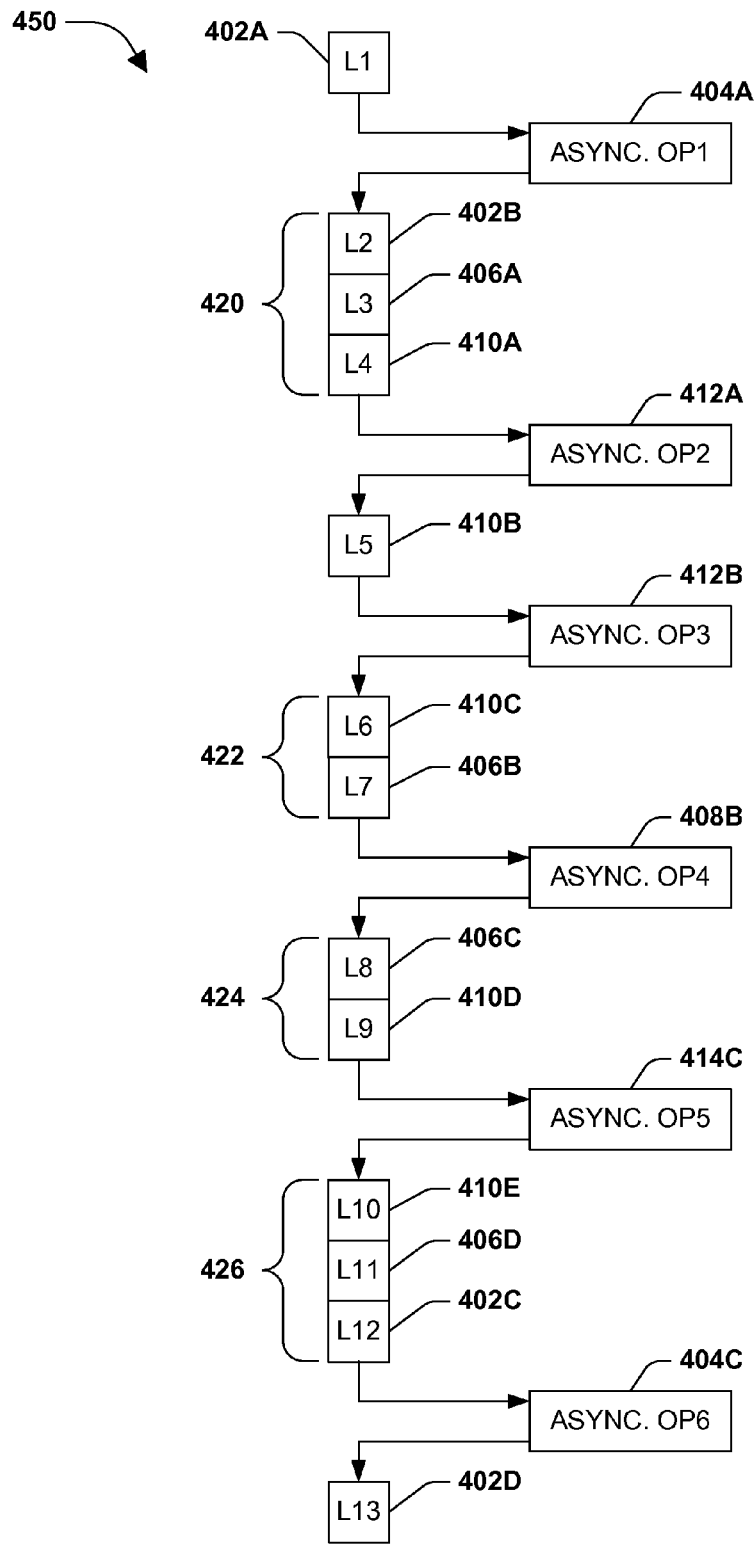

In the example embodiment 450 of FIG. 4B, the aggregation operations have been removed, and the local logics 402B, 406A, 410A have been combined 420. In this embodiment, the respective aggregation operations in a portion of asynchronous programming code, having more than one level of hierarchy, have been unrolled. Here, the unrolling comprises combining elements of a multi-level iterative execution of the asynchronous programming code to a single level iterative execution. In one embodiment, the unrolling can comprise converting an aggregation operation into a sequential operation comprising concatenated local logic for the aggregation operation.

For example, the aggregation operations can be removed, and the local logic combined, where the local logic code sections are combined between asynchronous operations in a sequential asynchrony execution. As an illustrative example, in FIGS. 4A and 4B, local logic two 402B is combined with local logic three 406A, when aggregation operation one 404B is removed; and the combination of local logic two and three is combined with local logic four 410A when aggregation operation two 408A is removed; to create the concatenated logic 420, which resides between asynchronous operation 1 404A and asynchronous operation two 412A. Further, removal of aggregation operation two 408A creates concatenated local code 422, comprising local logic six 410C and seven 406B, which reside between asynchronous operation three 412B and four 408B.

In this example, the aggregation operations one 404B and two 408A are converted to the concatenated local logic code 420 and 422. Further, aggregation operation one 404B and three 408C are converted to concatenated local logic code 424, comprising logic code 406C and 410D; and concatenated local logic code 426, comprising logic code 410E, 406D and 402C. In this way, in this example, local logic code from the second level (e.g., and third level, etc.) can be combined with local logic code from the first level, where the second level local logic code follows the first level local logic code as directed by the aggregation operation. The unrolled hierarchy of operations, as illustrated by the example 450, comprises merely local logic code and asynchronous operations, for example, arranged in a single level iterative execution comprising sequential asynchrony execution, for example.

Returning to FIG. 3, at 312, a thread context switch is performed in the unrolled portion of asynchronous programming code merely at an asynchronous operation. For example, in the example 400 of FIG. 4A, traditionally, a thread context switch is performed for the respective operations (e.g., as illustrated by the context switches 210 and 220 of FIG. 2). Therefore, in this example, a thread is attached at a start of the respective local logics L1-L13, and detached at an end (e.g., prior to beginning the operations). However, in the example 450 of FIG. 4B, a thread context switch is merely performed for the asynchronous operations 404A, 412A, 412B, 408B, 414C and 404C. In this way, in this example, a number of thread context switches, which can be computationally costly, can be reduced, from thirteen (e.g., FIG. 4A) to six (e.g., FIG. 4B). It can be appreciated that as asynchronous code becomes more complex and deeper in levels of hierarchy, for example, the reduction of thread context switches can be more significant.

Having performed the thread context switches at merely the asynchronous operations, the exemplary method 300 ends at 314.

In one embodiment, a simple example of pseudo code that illustrates both asynchrony and sequential programming that makes a more efficient and easy to program, may comprise, for example:

```
IEnumerable<Operation> ExecuteOperations( )
{
...
operation1 = new Operation1(someLocalContext);
yield return operation1;
operation2 = new Operation2(operation1.Result, someLocalContext);
yield return operation2;
... // Handles operation2.Result
}
```

In this example, an asynchronous operation 1 is executed, then the execution is yielded on return of results from operation 1. In this example, after yielding on return, the operation can execute in a framework, and a process thread for the execution is released until the operation is completed. Further, operation 2 gets some result from operation 1 and some local context, the execution is yielded to operation 2. In this example, the asynchronous code can be written in a same block of code, share the same variables, and results of previous operations can be received directly. In this embodiment, logic can be maintained in one place, it is more efficient, and it is easier for a programmer to understand, for example.

In one aspect, when an exception is thrown in synchronous programming execution, and it is not rectified, for example, the exception is thrown to a top of the execution stack. In this way, for example, a programmer can become aware of the error at a time of its occurrence, and devise a possible solution. However, in asynchronous programming execution, when an exception is thrown it is not typically thrown to the top of the execution stack, for example, which may make it more difficult for the programmer to identify a reason for the error.

Figure 5:
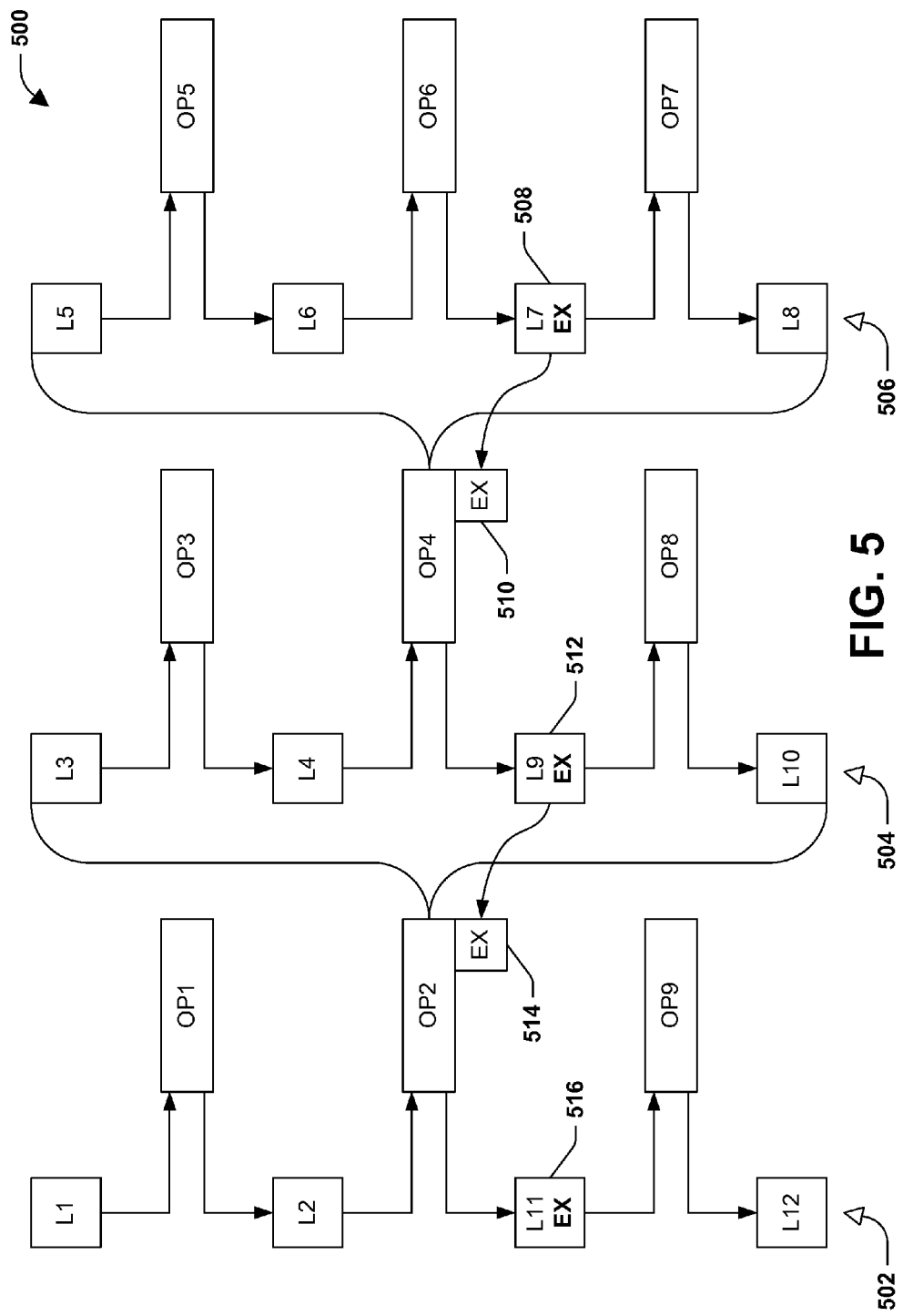
FIG. 5 illustrates an example embodiment of an execution stack arrangement, where an exception can be propagated to a top of the execution stack.

In one embodiment, in this aspect, an operation exception thrown at a second level can be propagated up to a first level in the asynchronous programming execution at runtime. FIG. 5 illustrates an example embodiment 500 of an execution stack arrangement, where an exception can be propagated to a top of the execution stack. The example embodiment 500 comprises three levels 502, 504, 506 of hierarchy, which may result from aggregation operations, such as at operation two in level one 502, and operation four in level two 504, for example.

In the illustrated example, an exception is thrown at the logic code seven 508, which can comprise a special condition that may change an arranged flow of programming execution, such as invalid input data returned from an asynchronous operation (e.g., operation six in level three 506). The exception at 508 is propagated up to operation four in the second level 504, at 510; and further propagated up to operation two in level one 502, at 514. The propagation of the exception to operation 2 allows it to be thrown to a top of the stack at logic code execution 11 516, in level one 502.

In one embodiment, restricting operations to using merely strongly typed operation results in the asynchronous programming, at respective levels, can facilitate propagation of an exception to the top of the execution stack. For example, a programming framework's type system can feature strong typing when operations are restricted on how values of operations result types can be intermixed. The following is an illustrative example of pseudo code comprising strongly typed definitions on the operation results:

```
class MyOperation : AsyncOperation<TResult>
{
...
}
```

Here, the operation result can be acquired after the "yield return":

```
IEnumerable<Operation> ExecuteOperation(...)
{
...
yield return myOperationInstance;
// handles myOperationInstance.OperationResult ...
...
}
```

In one embodiment, in this aspect, an exception that occurs during an operation (e.g., asynchronous operation, aggregation operation, and/or a microservice operation) execution, may be available at the operation's OperationException field, for example, as illustrated in the following pseudo code:

```
IEnumerable<Operation> ExecuteOperation(...)
{
...
yield return operation;
// handling operation.OperationException ...
...
}
```

In this aspect, in one embodiment, the second level programming execution may be running on a second thread and the first level programming execution may be running on a first thread. That is, for example, the asynchronous execution can comprise a multi-thread execution. In a multithreaded application of programming, exception propagation across threads is typically not supported by programming language, as it can be with a synchronous, single-thread application. Normally, an application developer needs to manually event the exception across threads in the multi-thread scenario. This manual eventing across thread needs to comprise very careful exception checking and eventing on every potential multi-threaded operation, which can be cumbersome.

This can be overcome by providing for the strong-typed operation results at a programming framework level, for example. In this embodiment, with strongly typed operation results, when subsequent operations access a previous operation result while the previous operation fails with an exception, the operation exception in the previous operation can be automatically propagated one level up by the framework in this solution, for example. This result may be illustrated in FIG. 5, as described above. The following is an example of pseudo code that may be associated with the example embodiment 500 of FIG. 5:

```
class Operation0
{
    IEnumerator<Operation> ExecuteOperation(...)
    {
        ...
        yield return operation1;
        ...
        yield return operation2;
        ...
        yield return operation9;
    }
}
class Operation2
{
    IEnumerator<Operation> ExecuteOperation(...)
    {
        ...
        yield return operation3;
        ...
        yield return operation4;
        ...
        yield return operation8;
    }
}
class Operation4
{
    IEnumerator<Operation> ExecuteOperation(...)
    {
        ...
        yield return operation5;
        ...
        yield return operation6;
        ...
        // Some exception thrown here
        ...
        yield return operation7;
    }
}
```

In this example, when the exception happens after operation six, at 508, and before operation seven, the exception will be propagated from operation four 510 to operation two 514. If code after "yield return operation4" doesn't handle the exception in the operation four, then the exception is further propagated from operation two to operation zero, at 516, and so on, for example. As an example, if there is no exception handling throughout all virtual call stacks (e.g., possibly across threads), operation seven at level three 506, operation eight at level two 504 and operation nine at level one 502 will not be executed. In one embodiment, when utilizing this type of exception propagation, the call stacks can be concatenated from potentially different threads into the operation exception, for example, which may greatly help the programmer find a cause of the exception.

In another aspect, batch processing of operations from different process threads may be used to improve an applications' performance, for example. In one embodiment, batching can comprise combining a first operation request with one or more second operation requests to be executed as a batch in asynchronous operation execution. For example, in server-based applications, batch processing may be an efficient way to improve the server applications' performance and/or to mitigate bandwidth use (e.g., and improve a client/end-user performance).

In one embodiment, in this aspect, a same type of batch-capable operation can be combined from different process threads into a batch call for the respective operations. Batching the operations can comprise using a primitive service to support batch processing of operations, where the primitive service can be used to change a thread-scheduling mechanism in the programming framework. For example, in a programming framework, thread scheduling can refer to how the process threads are assigned to support runtime dynamic variables, and/or static processing logics in the framework.

As an illustrative example, a simple implementation of thread scheduling may comprise a "First In First Executed operation". However, using the primitive service in the framework, a more sophisticated scheduling, such as batch execution or prioritized execution, may be implemented. In this example, an operation for the primitive service may not be executed directly (e.g., First in First Executed), and instead, the operations can be arbitrated before execution. In this example, the arbitration for batch processing may collect a desired number of primitive service operations before execution in a batch call. For costly server to server remote calls, for example, batch processing of operations executed on different threads may provide for one remote call to the remote server; and after the remote call, the different results can be delivered back to the call thread, thereby mitigating these costly remote calls.

In another aspect, yielding an operation in asynchronous programming execution can mean releasing the process thread and waiting until the operation finishes. As an example, sequential yielding can results in an execution plan of executing one operation after another, in sequence. Sometimes, two operations may be unrelated and may be able to be executed at a same time. In one embodiment, two or more operations in the asynchronous programming can be executed in parallel.

Figures 6A, 6B:
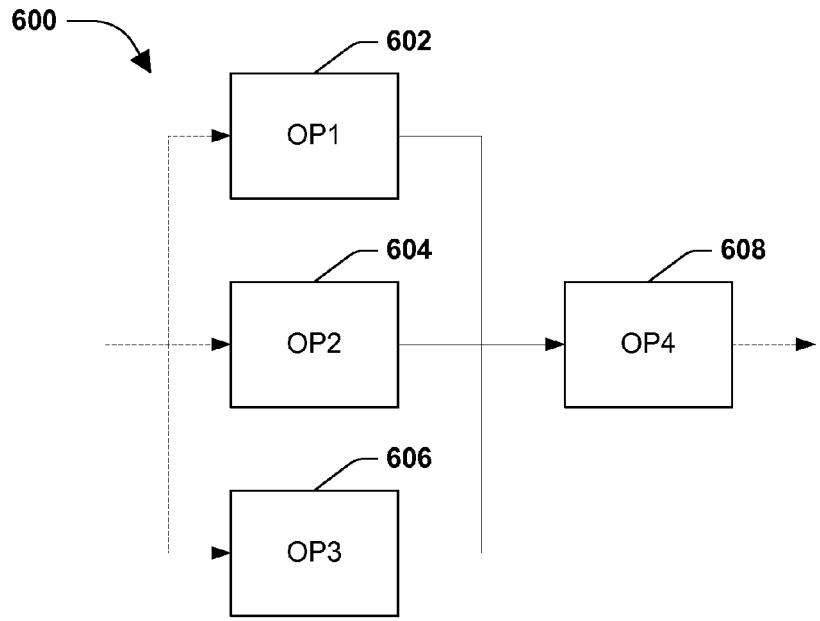
FIG. 6A is a flow diagram of an example embodiment where two or more operations may be executed in parallel.
FIG. 6B illustrates an example pseudo code where two or more operations may be executed in parallel.

FIG. 6A is a flow diagram of an example embodiment 600 where two or more operations may be executed in parallel, such as when the operations are unrelated (e.g., a second operation does not need a result from a first operation to execute). In this example 600, operation one 602, operation two 604 and operation three 606 are executed in the execution stack at a same time, in parallel. Further, the results from the respective parallel operations are gathered at operation four 608, which is subsequently executed. While a more complex parallel operation is anticipated, the example embodiment 600 serves to illustrate one example, such as where a collection point may be implemented for a plurality of operation results.

Further, FIG. 6B illustrates an example pseudo code, which, when executed, can result in an execution stack similar to that of the example 600. In one embodiment, a block-on-yield operator can be used to execute two or more unrelated operations in parallel. At 652, for Operation1, the "BlockOnYield" operator is set to "false," which can mean that the execution on the process thread does not need to wait for results from Operation1 to begin the next operation, which is Operation2. Further, at 654, the "BlockOnYield" operator for Operation2 is also set to "false," which means that the process thread can move to the next operation without the results from Operation2.

At 656, the "BlockOnYield" operator for Operation3 is set to "true," which means that the process thread waits for the results from Operation3 before moving to the next operation. In this way, in this example, Operation1, Operation2, and Operation3 can respectively execute in parallel, such as on separate threads, and Operation4, at 658, is not executed until at least the results from Operation3 are returned. Further, in this example, at 658, the "BlockOnYield" operator for Operation4 is also set to "true," which means that the process thread will wait until results from Operation4 are returned to continue execution.

As described above, more complex execution plans can be implemented using the parallel execution. For example, using a combination of the execution plans, multi-thread, multi-level hierarchy can be implemented. Further, inside a parallel branch, for example, the "recursive iterator unrolling," as described above, can also apply. Using the unrolling techniques, for example, the thread context switches can also be mitigated for parallel execution, which can further provide for a more efficient execution of an application's programming.

In another aspect, by utilizing the "recursive iterator unrolling", described above, a completion of an operation at respective levels in the multi-level execution hierarchy can be readily determined, regardless of whether the operation is completed synchronously or asynchronously (e.g., at runtime, whether there is any real asynchronous operation after "recursive iterator unrolling" depending on runtime inputs). In one embodiment, in this aspect, determining whether an operation has completed at the respective levels can be used in an operations counter. For example, the application programmer may be able to gauge how far along the execution has progressed by viewing the operations counter. Further, the counter may tell the programmer where an execution is thrown, for example.

A system may be devised where an asynchronous programming framework provides efficient and easy to use asynchronous programming in a sequential manner. The system can mitigate thread context switches during execution of the asynchronous programming, providing a more efficient runtime; and can propagate exceptions to a top of the execution stack, in a way that is familiar to application developers, such as seen with synchronous programming. Additionally, the system may provide for operation call batching and parallel operation execution, thereby improving execution efficiency, for example.

Figure 7:
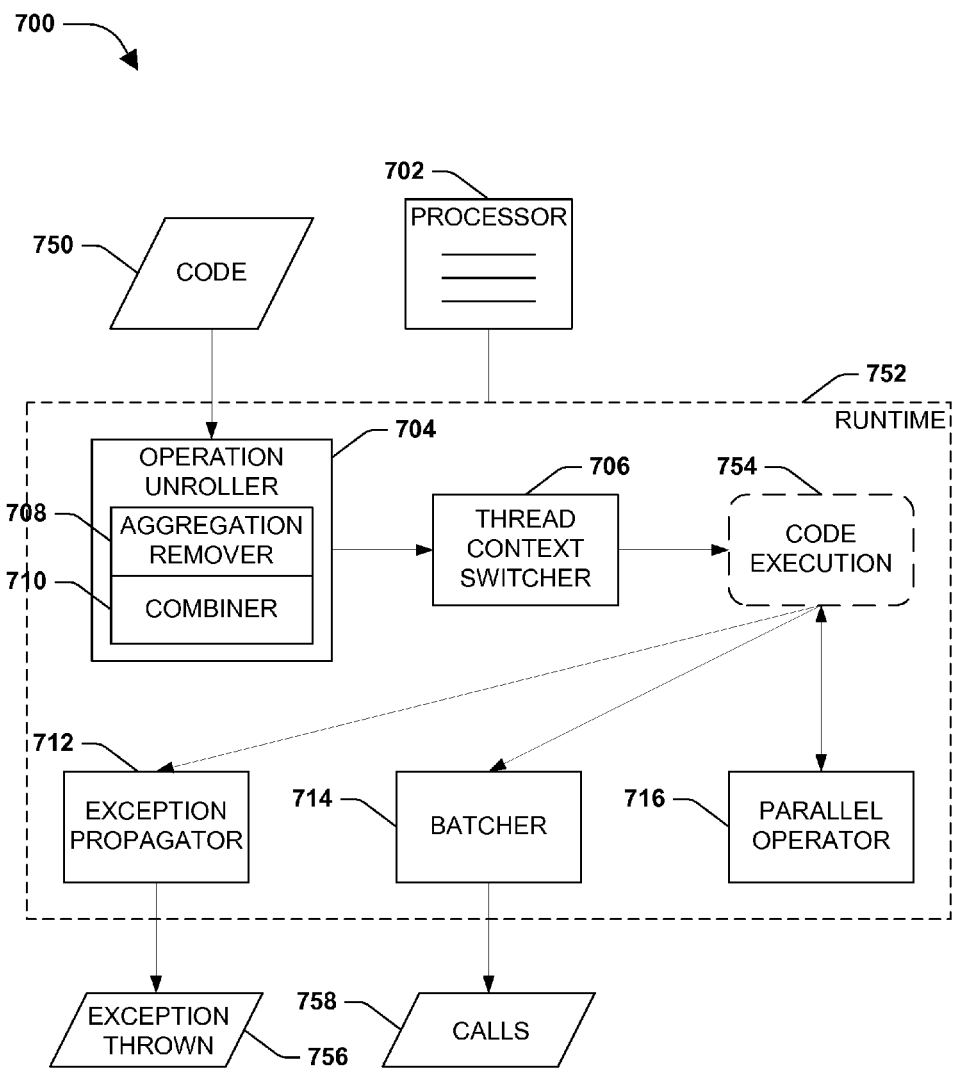
FIG. 7 is a component diagram of an exemplary embodiment of a system for improving asynchronous programming execution at runtime.

FIG. 7 is a component diagram of an exemplary embodiment of a system 700 for improving asynchronous programming and execution at runtime. A computer-based processor 702 is configured to process data for the system, and the processor 702 is operably coupled with an operation unrolling component 704. The operation unrolling component 704 unrolls aggregation operations in a portion of asynchronous programming code 750 that comprises more than one level of hierarchy. The operation unrolling component 704 unrolls aggregation operations by combining elements of a multi-level iterative execution of the asynchronous programming code 750 to a single level iterative execution, such as during code execution 754.

A thread context switching component 706 is operably coupled with the operation unrolling component 704, in order to perform a thread context switch in the unrolled portion of asynchronous programming code merely at an asynchronous operation during code execution 754. For example, the asynchronous programming code 750 can be written in a sequential asynchrony execution plan (e.g., where asynchronous operation calls at different levels in an execution hierarchy can be contained within a same code block).

In this example, the operation unrolling component 704 can remove aggregation operations and combine programming logic from different hierarchy levels, such as between asynchronous operations. In this way, merely local logic and asynchronous operations may remain in the execution plan, for example, and the execution plan can be single level instead of multi-level. Further, in this example, the thread context switching component 706 merely performs thread context switches (e.g., attach, detach) at truly asynchronous operations (e.g., and not aggregation operations), thereby mitigating a number of switches for the programming execution (e.g., and reducing computation resource use).

In one embodiment, the operation unrolling component 704 can comprise an aggregation removal component 708 that removes an aggregation operation from a first level (and/or other level(s)). Further, the operation unrolling component 704 can comprise a combining component 710 that combines local logic code from a second level with local logic code from the first level, where the second level local logic code follows the first level local logic code as directed by the aggregation operation. For example, when an aggregation operation indicates local logic in another level, the aggregation operation can be removed, and the local logic from the other level can be combined with local logic in the removed aggregation component's level. In this way, in this example, logic from the second level (e.g., and third level, etc.) is pushed to the first level to create the single level iteration execution.

In one embodiment, an exception propagation component 712 can propagate an operation exception 756 that is thrown at a second level up to a first level in the asynchronous programming execution 754 at runtime. In this embodiment, the second level programming execution may be running on a second thread and the first level programming execution may be running on a first thread. For example, the exception propagation component 712 may utilize strong typing for operation results in the programming framework. In this example, an exception thrown at a lower level in the execution hierarchy can be propagated to operations at a next level higher (e.g., and so-on), due to the strong typing requirement.

In one embodiment, a batching component 714 can combine a first operation request with one or more second operation requests, to be executed as a batch in asynchronous operations. In this embodiment, the first and second operation requests can comprise a same type of batch capable operation, and can be combined in a batch call 758, such as for a remote server to remote server call. In this way, merely one call can be made for the batch, instead of making calls for the respective operations, for example, where remote server to server calls can be bandwidth intensive.

In one embodiment, a parallel operation component 716 can provide for executing two or more operations in the asynchronous programming in parallel. For example, the parallel operation component 716 may provide the programming framework with an operator, which, when used in the programming code, can allow an execution process thread to continue to a subsequent operation without having to wait for the previous operation result. In this way, for example, a plurality of operations may be executed in parallel, such as on different threads, and their results can be collected at a desired point in the program execution stack.

Figure 8:
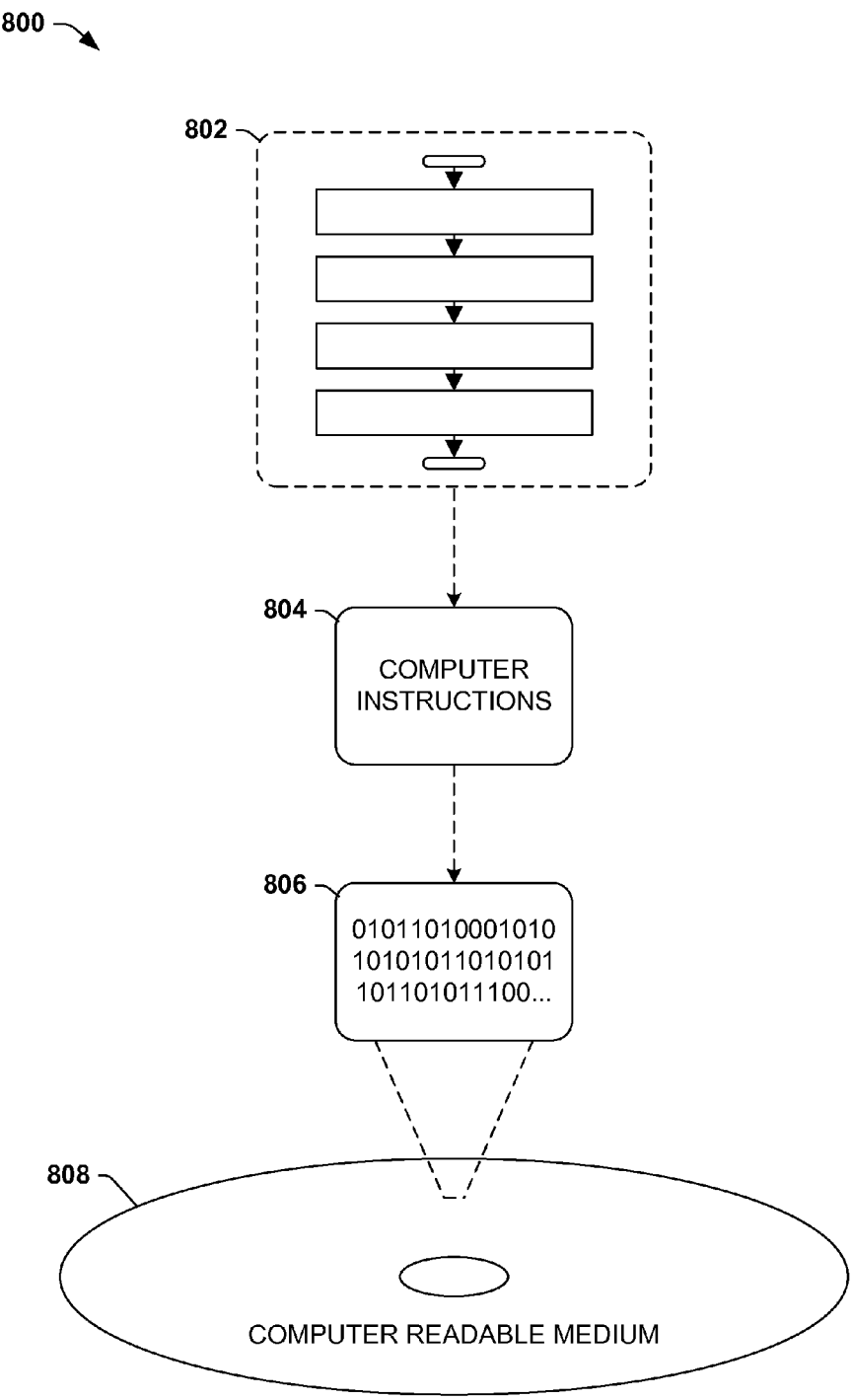
FIG. 8 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 8, wherein the implementation 800 comprises a computer-readable medium 808 (e.g., a CD-R, DVD-R, or a platter of a hard disk drive), on which is encoded computer-readable data 806. This computer-readable data 806 in turn comprises a set of computer instructions 804 configured to operate according to one or more of the principles set forth herein. In one such embodiment 802, the processor-executable instructions 804 may be configured to perform a method, such as at least some of the exemplary method 300 of FIG. 3, for example. In another such embodiment, the processor-executable instructions 804 may be configured to implement a system, such as at least some of the exemplary system 700 of FIG. 7, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 9:
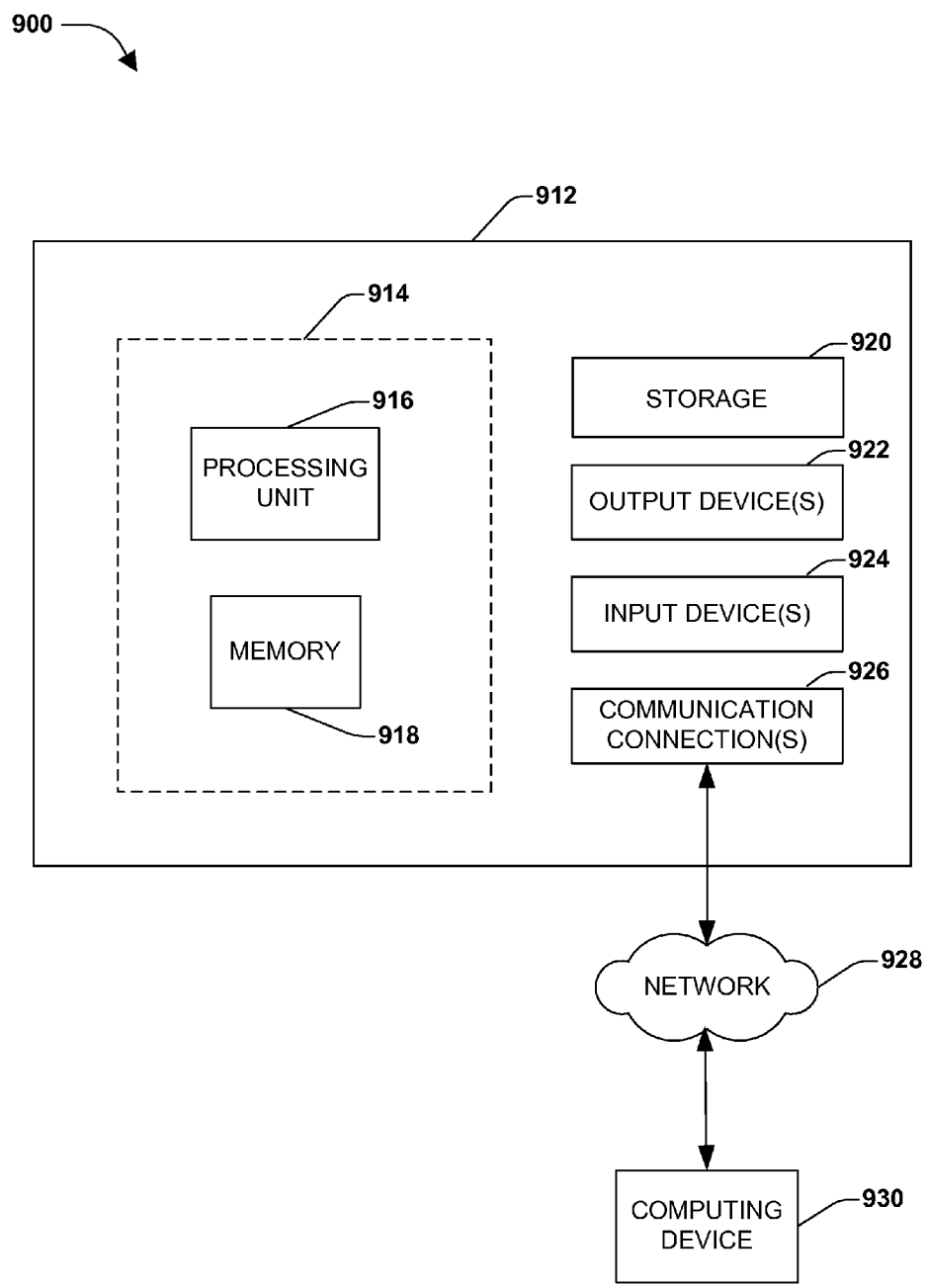
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 910 comprising a computing device 912 configured to implement one or more embodiments provided herein. In one configuration, computing device 912 includes at least one processing unit 916 and memory 918. Depending on the exact configuration and type of computing device, memory 918 may be volatile (such as RAM, for example), non-volatile (such as ROM, flash memory, etc., for example) or some combination of the two. This configuration is illustrated in FIG. 9 by dashed line 914.

In other embodiments, device 912 may include additional features and/or functionality. For example, device 912 may also include additional storage (e.g., removable and/or non-removable) including, but not limited to, magnetic storage, optical storage, and the like. Such additional storage is illustrated in FIG. 9 by storage 920. In one embodiment, computer readable instructions to implement one or more embodiments provided herein may be in storage 920. Storage 920 may also store other computer readable instructions to implement an operating system, an application program, and the like. Computer readable instructions may be loaded in memory 918 for execution by processing unit 916, for example.

The term "computer readable media" as used herein includes computer storage media. Computer storage media includes volatile and nonvolatile, removable and non-removable media implemented in any method or technology for storage of information such as computer readable instructions or other data. Memory 918 and storage 920 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 912. Any such computer storage media may be part of device 912.

Device 912 may also include communication connection(s) 926 that allows device 912 to communicate with other devices. Communication connection(s) 926 may include, but is not limited to, a modem, a Network Interface Card (NIC), an integrated network interface, a radio frequency transmitter/receiver, an infrared port, a USB connection, or other interfaces for connecting computing device 912 to other computing devices. Communication connection(s) 926 may include a wired connection or a wireless connection. Communication connection(s) 926 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 912 may include input device(s) 924 such as keyboard, mouse, pen, voice input device, touch input device, infrared cameras, video input devices, and/or any other input device. Output device(s) 922 such as one or more displays, speakers, printers, and/or any other output device may also be included in device 912. Input device(s) 924 and output device(s) 922 may be connected to device 912 via a wired connection, wireless connection, or any combination thereof. In one embodiment, an input device or an output device from another computing device may be used as input device(s) 924 or output device(s) 922 for computing device 912.

Components of computing device 912 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 912 may be interconnected by a network. For example, memory 918 may be comprised of multiple physical memory units located in different physical locations interconnected by a network.

Those skilled in the art will realize that storage devices utilized to store computer readable instructions may be distributed across a network. For example, a computing device 930 accessible via network 928 may store computer readable instructions to implement one or more embodiments provided herein. Computing device 912 may access computing device 930 and download a part or all of the computer readable instructions for execution. Alternatively, computing device 912 may download pieces of the computer readable instructions, as needed, or some instructions may be executed at computing device 912 and some at computing device 930.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A computer-based method for executing asynchronous programming code, comprising:
   unrolling an aggregation operation in a portion of asynchronous programming code having multiple levels in a hierarchy, the unrolling comprising combining first local logic code in a first level of the hierarchy associated with a first thread with second local logic code in a second level of the hierarchy associated with a second thread, and converting the aggregation operation into a sequential operation comprising concatenated local logic code of the aggregation operation, wherein the unrolling effectively removes thread context switching associated with the aggregation operation and performs thread context switching instead at an asynchronous operation in the unrolled portion of asynchronous programming code; and
   responsive to detecting an operation exception thrown at the second level of the hierarchy, propagating the operation exception up to the first level of the hierarchy, wherein call stacks of the first thread and the second thread are concatenated into the operation exception.

2. The method of claim 1, the propagating the operation exception performed at runtime.

3. The method of claim 1, further comprising propagating the operation exception up from a third level of the hierarchy.

4. The method of claim 1, the asynchronous programming code comprising one or more local logic codes that are executed in a defined sequence.

5. The method of claim 1, comprising propagating the operation exception up to a top of an execution stack.

6. The method of claim 1, the second level running on the second thread and the first level running on the first thread.

7. The method of claim 1, wherein the operation exception occurs during one or more of the following: an asynchronous operation, an aggregation operation, or a microservice operation.

8. The method of claim 1, comprising restricting operation results in the asynchronous programming code to merely strong typed operation results.

9. The method of claim 1, comprising combining a first operation request with one or more second operation requests to be executed as a batch in one or more asynchronous operations.

10. The method of claim 1, comprising batching two same type of batch-capable operations from different threads into a batch call.

11. The method of claim 1, comprising using a service to support batch processing of operations, comprising using the service to change a thread-scheduling mechanism.

12. The method of claim 1, comprising executing two or more operations in the asynchronous programming code in parallel.

13. The method of claim 1, comprising using a block-on-yield operator to execute two or more unrelated operations in parallel.

14. The method of claim 1, comprising determining whether an operation has completed via an operations counter.

15. A system comprising:
   a processor;
   an operation unrolling component configured to unroll an aggregation operation in a portion of asynchronous programming code having multiple levels in a hierarchy, the unrolling comprising combining first local logic code in a first level of the hierarchy associated with a first thread with second local logic code in a second level of the hierarchy associated with a second thread, and converting the aggregation operation into a sequential operation comprising concatenated local logic code of the aggregation operation, wherein the unrolling effectively removes thread context switching associated with the aggregation operation and performs thread context switching instead at an asynchronous operation in the unrolled portion of asynchronous programming code;
   code configured to respond to detecting an operation exception thrown at the second level of the hierarchy by propagating the operation exception up to the first level of the hierarchy and concatenating call stacks of the first thread and the second thread into the operation exception; and
   an operations counter which indicates whether an operation has completed at respective levels of the hierarchy.

16. The system of claim 15, further comprising an exception propagation component configured to propagate an operation exception up to a top of an execution stack.

17. The system of claim 15, further comprising a batching component configured to combine a first operation request with one or more second operation requests to be executed as a batch in one or more asynchronous operations.

18. The system of claim 15, further comprising a block-on-yield operator.

19. The system of claim 15, further comprising a parallel operation component configured to provide for executing two or more operations in the asynchronous programming code in parallel.

20. A tangible computer readable storage device, which is not a signal per se, comprising computer executable instructions which when executed via a processing unit perform a method, comprising:
   unrolling an aggregation operation in a portion of asynchronous programming code having multiple levels in a hierarchy, the unrolling comprising combining first local logic code in a first level of the hierarchy associated with a first thread with second local logic code in a second level of the hierarchy associated with a second thread, and converting the aggregation operation into a sequential operation comprising concatenated local logic code of the aggregation operation, wherein the unrolling effectively removes thread context switching associated with the aggregation operation and performs thread context switching instead at an asynchronous operation in the unrolled portion of asynchronous programming code; and
   responsive to detecting an operation exception thrown at the second level of the hierarchy, propagating the operation exception up to the first level of the hierarchy, wherein call stacks of the first thread and the second thread are concatenated into the operation exception.

* * * * *